United States Patent
Judge

(10) Patent No.: US 9,126,681 B1
(45) Date of Patent: Sep. 8, 2015

(54) AUTOGIRO PITCH CHANGING ROTOR HEAD

(71) Applicant: James Joseph Judge, Westminster, MD (US)

(72) Inventor: James Joseph Judge, Westminster, MD (US)

(*) Notice: Subject to any disclaimer, the term of this patent is extended or adjusted under 35 U.S.C. 154(b) by 0 days.

(21) Appl. No.: 14/604,854

(22) Filed: Jan. 26, 2015

(51) Int. Cl.
 *B64C 11/06* (2006.01)
 *B64C 27/59* (2006.01)
 *B64C 27/02* (2006.01)

(52) U.S. Cl.
 CPC ............... *B64C 27/59* (2013.01); *B64C 27/022* (2013.01)

(58) Field of Classification Search
 CPC .... B64C 27/59; B64C 27/022; B64C 27/021; B64C 27/025
 USPC .................................. 416/102, 148
 See application file for complete search history.

(56) References Cited

U.S. PATENT DOCUMENTS

| | | | |
|---|---|---|---|
| 1,870,928 A | 8/1932 | Smith | |
| 2,830,669 A | 4/1958 | Klockner | |
| 3,310,120 A * | 3/1967 | Vacca | 416/103 |
| 3,720,387 A * | 3/1973 | Foote | 244/17.25 |
| 4,585,394 A | 4/1986 | Schwarz et al. | |
| 4,741,672 A | 5/1988 | Bruener | |
| 5,304,036 A | 4/1994 | Groen | |
| 5,826,822 A | 10/1998 | Rehm | |
| 8,573,528 B2 | 11/2013 | Polovinkin | |

FOREIGN PATENT DOCUMENTS

WO    WO 2014/155208 A1 * 10/2014 ............. B64C 27/00

* cited by examiner

*Primary Examiner* — Dwayne J White
*Assistant Examiner* — Jason Fountain

(57) ABSTRACT

A mechanism in a teetering rotor head that has an actuating shaft with a carrier, in a hollow spindle, in a hollow central tower, with teetering sidewalls and with rotor blade anchor blocks bolted between them, and with blade root anchor bolts that turn with the blades, connected by 4 short straight levers and 2 sliding plates that work together to turn the bolts and twist the blades, changing the pitch.

1 Claim, 8 Drawing Sheets

AUTOGIRO PITCH CHANGING ROTOR HEAD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION BY REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

A rotorcraft is an aircraft that obtains lift from rotating rotor blades instead of a fixed wing. The blades are carried in a rotor head which allows them to spin. An autogiro has no engine power to the blades, it's blades being powered by the wind as the aircraft moves forward. It usually uses a teetering rotor head, because they are easy to build and maintain. A helicopter, by contrast, is a rotorcraft with engine power to the blades, that can change the pitch of the blades allowing it to hover and take off vertically. This is a great additional ability, but it comes at a great price. Helicopters are very complicated and expensive both to manufacture and to maintain. They also require a great deal more training and skill to fly.

This invention describes a pitch changing teetering rotor head designed primarily for the single and two-place autogiro, but adaptable for all teetering head rotorcraft of any size or configuration including but not limited to autogiros, helicopters, drones, and radio-controlled toys. These documents constitute the best mode for creating and using this invention.

Spinning rotor blades require many things to happen at one time and on different axes with different motions, rotor blade spin on a vertical axis, teetering on a horizontal axis, with horizontal flap and vertical lead and lag mostly accommodated by the teetering motion, the addition of a feathering axis to twist the blades to change the pitch has necessitated a very complicated rotor head to accomplish all of this at once.

This complication and expense has put the vital capability of rotor blade pitch change, and the concomitant ability to take off vertically, out of the reach of the small autogiro community, and has made helicopters the only and very expensive option.

Prior inventors developed the teetering rotor head initially for autogiros, which resolves the spin and flap forces with a very elegant simplicity, but until now no one has succeeded in adding pitch change without also adding too much of the complexity of the helicopter rotor head.

The lack of pitch change in the commonly used teetering rotor head means that the autogiro requires a runway to become airborne, which severely limits its flexibility. It can land in a very small space or rough field, but cannot take off again from that space or rough field.

At the present time rotor blade pre-rotators can only be used to provide an RPM less than flying speed, since flying speed will break contact with the ground, and the torque from the pre-rotator motor will cause the fuselage to spin, a loss of control, and a serious crash. Thus they can shorten the runway needed but not eliminate it.

In using the pitch change capability of this rotor head for vertical take off, the pitch of the blades is reduced to reduce lift and drag, and a pre-rotator device is used to spin up the blades to more than flying speed. More than flying speed becomes safe because reducing pitch reduces lift so that contact with the ground is not lost. The pre-rotator is then disengaged, eliminating the torque that would spin the fuselage, and the pitch is increased to a flying angle. With the power of the stored kinetic energy in the free-spinning blades, the autogiro will literally leap straight up into the air, and forward propulsion is applied to maintain flight. No runway needed.

The key is that to be successful, it must be financially viable as well as mechanically viable. Previous designs may have been mechanically viable, but still too complicated and expensive to be practical, so not financially viable.

A large proportion of the one and two place autogiro community consists of home-builders and tinkerers who need to fly on the cheap, which usually means make it yourself in your garage. This pitch change rotorhead can be made with ordinary shop tools, a drill press, table or radial arm saw, and lathe, and with ordinarily obtainable materials, no special castings required. For a homebuilder, the cost to make it is only slightly more than a standard teetering rotor head, yet the gain in usefulness and flexibility is monumental. This invention is needed precisely because it is the affordable alternative.

BRIEF SUMMARY OF THE INVENTION

This rotorhead has a hollow central tower with bearings inside, mounted on hollow spindle with an actuating shaft inside. The teetering sidewalls are mounted on the teeter bolt with the bearings in the top of the tower instead of in the sidewalls. Rather than mount the rotor blades directly between the sidewalls, rotor blade anchor blocks drilled to pass large blade root anchor bolts are mounted there, with moveable secondary blade blocks that will carry the blades mounted outside the sidewalls on the same bolt. Blade root pitch change levers are attached to the large blade root anchor bolts, on the inside, where they come through the rotor blade anchor blocks between the sidewalls, so that when the levers move, the bolts turn and move the secondary blade blocks with the blades attached.

There is a carrier, with bearings, and with levers attached, mounted on top of the actuating shaft inside the tower, with the levers extending through windows cut in the side of the tower. The levers join sliding plates mounted on the inside of the sidewalls which are stabilized by the teeter bolt and stabilizing pins, so that when the actuating shaft moves vertically the plates move with it.

The sliding plates are also connected to the levers on the large blade root anchor bolts, so that when the actuating shaft moves, and the plates move, the anchor bolts turn, and the pitch of the blades changes.

The Object of this Invention is to:
  Provide pitch change capability to the autogiro community.
  Provide a jump start ability using pitch change
  Provide continuous pitch change during flight
  Provide safe limits to prevent problems during flight.
  Provide this capability at an affordable cost.
  Provide do it yourself simplicity for homebuilders.
  Provide a simplicity that requires little maintenance time or cost.
  Provide a design that uses standard materials, no special castings.
  Use concepts of design that are already well proven and in the public domain.
  Use ordinary manufacturing methods that are widely used and available.

DETAILED DESCRIPTION OF THE INVENTION

Figure 1:
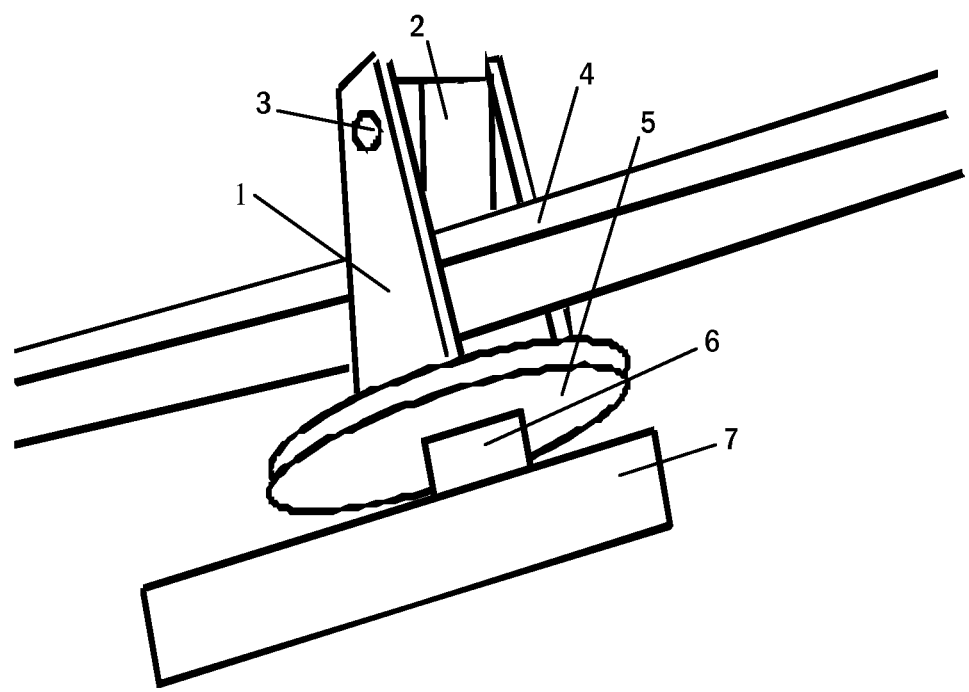
FIG. 1 is a typical teetering rotor head for illustration of the current art.

For illustration of the current art, FIG. 1 shows the most commonly used teetering rotor head design, including fixed side walls 1, the teeter bolt 3, teetering central tower 2 with attached hub bar 4 teetering between the side walls, pre-rotator plate 5, collar/spacer 6, and top gimbal member 7.

In contrast, this invention takes it's inspiration from Finnish designer Jukka Tervamaki's 1973 design of a fixed central tower with the main bearings inside, and teetering sidewalls with the rotor blades bolted between them.

This rotor head is mounted on the aircraft according to it's blueprints, normally with the threaded main spindle 8 clamped to the top member of the steering gimbal 7 with a washer and nut. Control rods are likewise attached according to the aircraft's blueprints.

Figure 2:
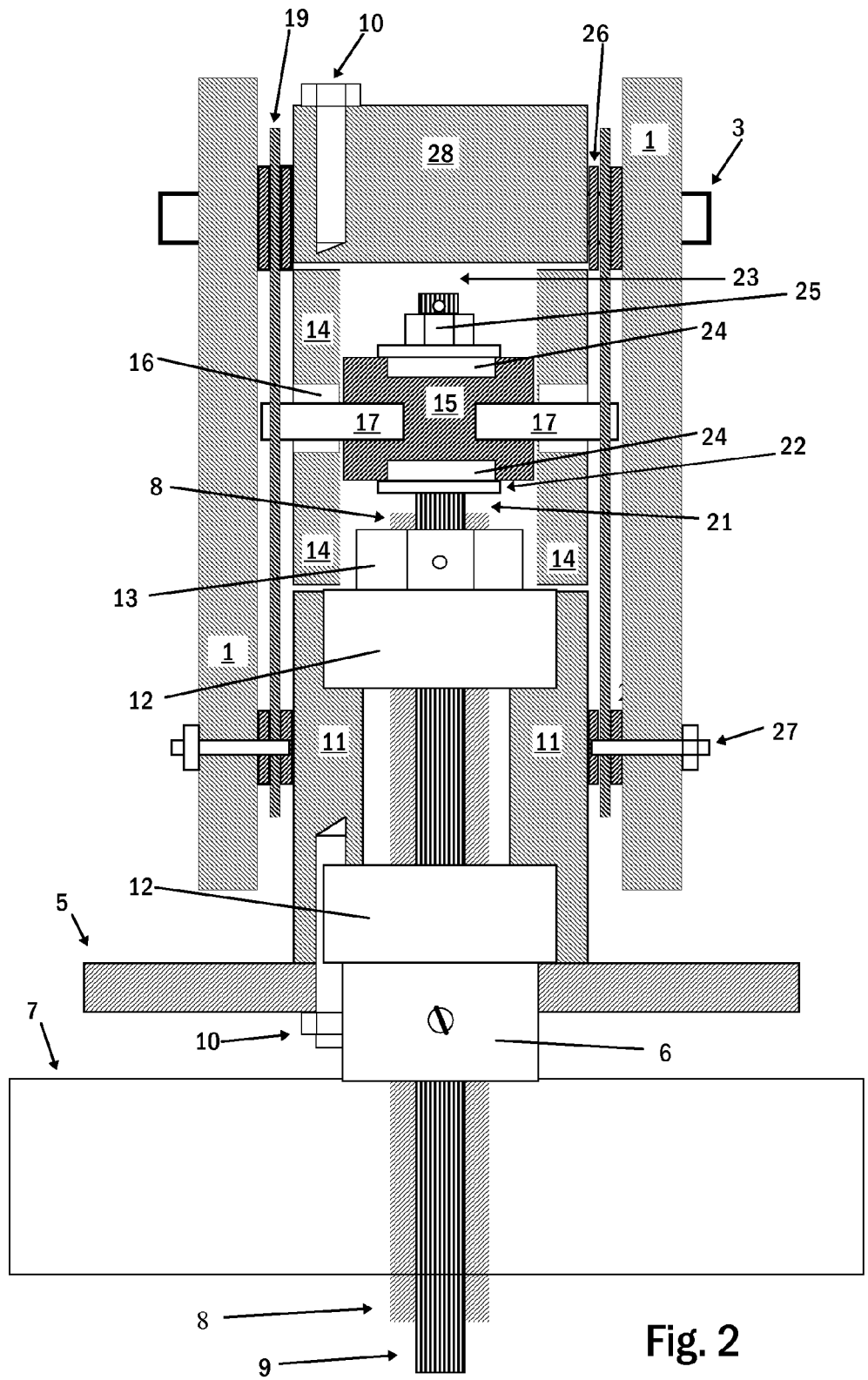
FIG. 2 is a cross section of the central tower and it's interior parts.

The basic design consists of a three piece central tower 11, 14, 28 in FIG. 2, machined inside to receive bearings 12, a hollow main spindle 8 and it's locking nut 13, and pitch change parts including the actuating shaft 9, carrier 15, upper pitch change levers 17, carrier bearing locking collar 22, carrier thrust bearings 24, and the ⅜ locking nut 25. A window 16 is cut in the tower middle section 14 to allow the upper pitch change levers to pass. The tower top section is drilled for a teeter bolt 3. The three tower pieces plus the pre-rotator plate 5 are held together by four tower assembly bolts 10.

Figure 3:
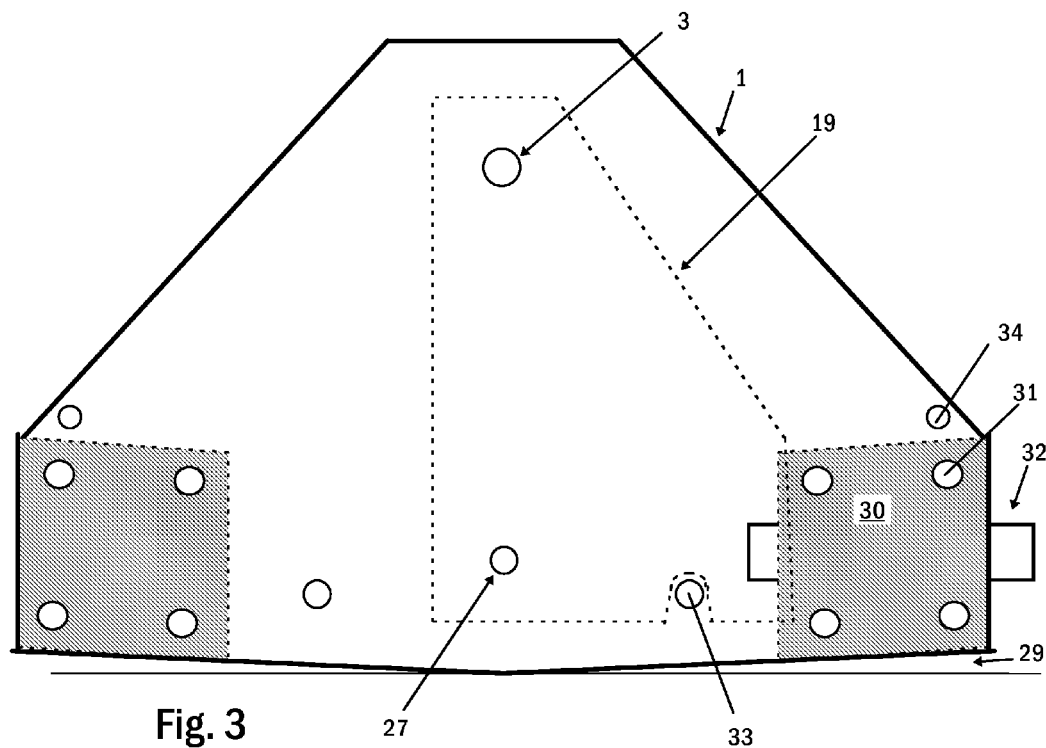
FIG. 3 is a drawing of the sidewalls.
Figure 12:
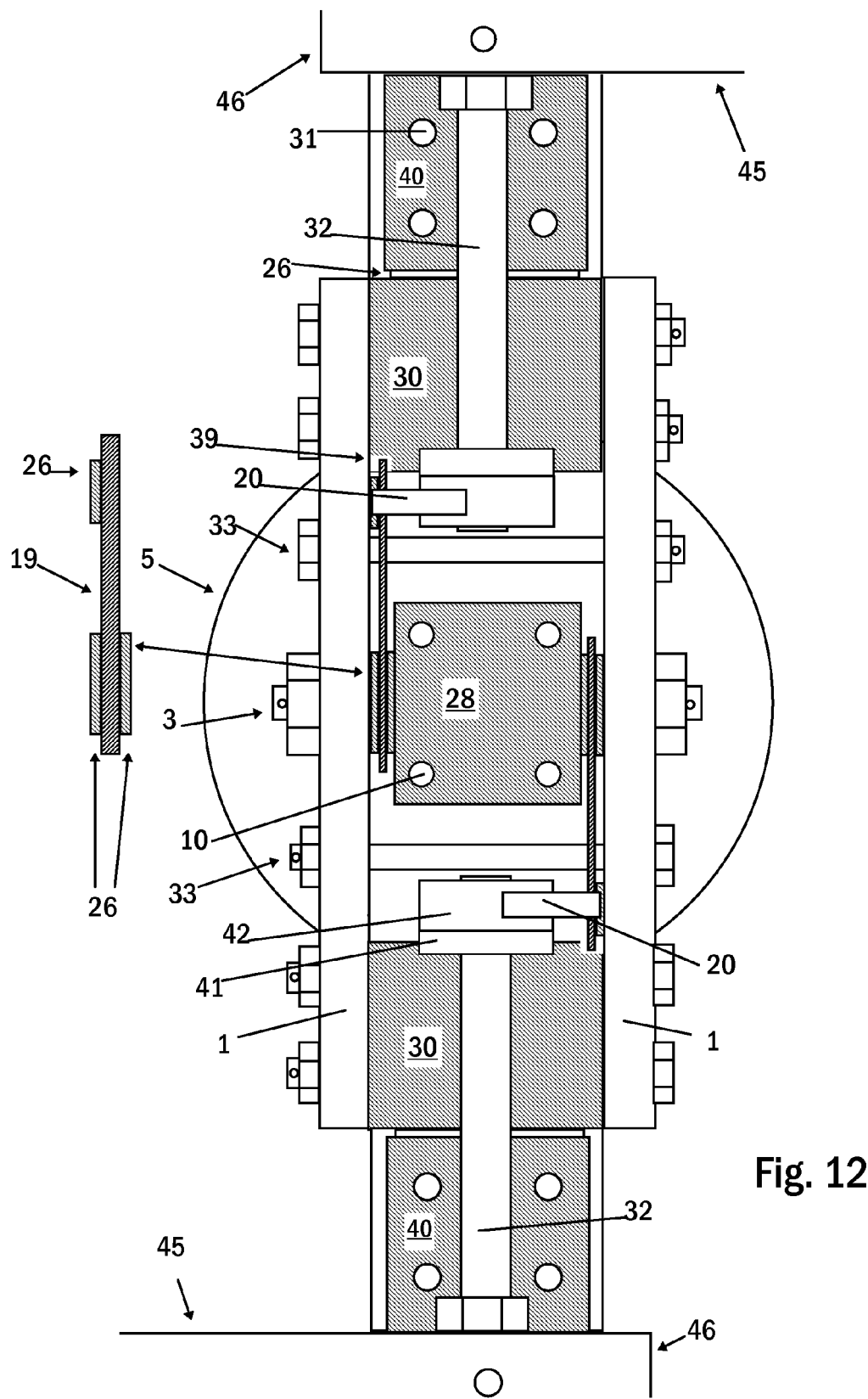
FIG. 12 is a cross section of the whole rotor head viewed from the top.

Two teetering sidewalls 1 in FIG. 3 and FIG. 12, have rotor blade anchor blocks 30 bolted between them on each side, which each carry just one large blade root anchor bolt 32 to attach each blade, which is turned by attached blade root pitch change levers 20 to change the pitch of the blades.

To effect pitch change, the operator supplies control inputs through a push-pull cable or a lever system (custom made to fit each specific giro model) attached to the actuating shaft 9 which passes through the main spindle 8, causing the shaft to be raised and lowered.

The main spindle 8 has a pressed-on locking collar/spacer 6 to make contact with the gimbal top member 7. The collar is further locked in place with two set screws that seat ⅛ inch into the spindle. Since the actuating shaft passes though the spindle it cannot be secured with a through-pin. If desired, a steel collar could be used, which could then be welded to the steel spindle. This is not recommended since the heat of welding could cause warping of the spindle.

The pre-rotator plate 5 fits over the locking collar 6 with a center hole large enough to insure that there will be no interference. It has 4 holes drilled for the tower assembly bolts 10.

The tower bottom section 11 is machined to receive two main bearings 12, is center drilled to freely pass the main spindle 8, and is drilled to receive the four tower assembly bolts 10.

The main spindle 8 passes through the bearings 12 and is held in place with a locking nut 13 and two set screws as for the collar 6 at the bottom.

The tower middle section 14 is center drilled large enough to pass the carrier 15 without interference, has two windows 16 drilled to pass the upper pitch change levers 17, and is drilled to receive the four tower assembly bolts 10.

Figure 4:
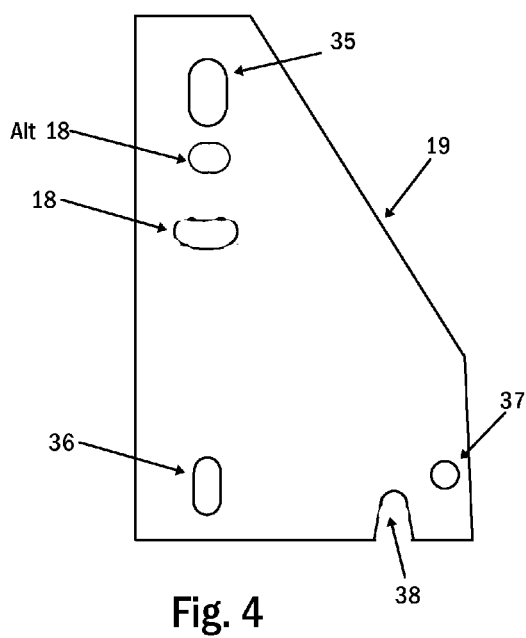
FIG. 4 is a drawing of the sliding pitch linkage plate.

The windows 16 are drilled oblong vertically and placed and sized to allow the vertical movement of the upper pitch change levers 17, and to insure that they guide the levers to enter the curved slot 18 in the pitch linkage plate 19 shown in FIG. 4. Passage through these windows in the spinning tower causes the levers and their carrier to spin in the bearings at the top of the actuating shaft, so that the shaft is only required to move vertically, and only about ⅜ inch, which simplifies the control mechanism required in the cockpit. The actuating shaft has a vertical slot cut near it's bottom end, and the spindle has a threaded hole placed so that a set screw will enter the slot, allowing the shaft to move vertically but not to spin.

The carrier 15 is mounted on the top of the actuating shaft 9 with two thrust bearings 24, and is secured to the actuator shaft with a ⅜ locking nut 25 and cotter key. Two upper pitch change levers 17 are threaded into opposite sides of the carrier. See FIG. 13 for an alternative carrier design.

The two upper pitch change levers 17 have PTFE sleeve bearings on the distal ends to ensure smooth movement in the curved receiver slot 18 of the pitch linkage plate 19 shown in FIG. 4

Unique to this design, pitch linkage plates 19 have a vertical sliding motion on the inside of the sidewalls stabilized by the teeter bolt 3 and a stabilizing pin 27. The elements are assembled such that these sliding pitch linkage plates, teetering with the sidewalls, engage the upper pitch change levers 17 from the actuating shaft 9 at the top, and also engage the blade root pitch change levers 20 attached to the blade root anchor bolts 32, and working together, with their interaction contained between the two teetering sidewalls, they constitute a unique mechanical structure to transfer the vertical movement of the actuating shaft to the blade root anchor bolts, turning the bolts and changing the pitch of the rotor blades.

This simplified internal mechanical structure with only a few moving elements, is in contrast to existing designs which are too complicated to be successful in the marketplace.

As shown in FIGS. 2 and 12, Bronze oil impregnated washers 26 are placed on both sides of the pitch linkage plate 19 where it meets the teeter bolt 3, the stabilizing pin 27, and the blade root pitch change lever 20, both to stabilize the plate and insure smooth sliding.

The tower top section 28 is drilled to receive the teeter bolt 3 and it's PTFE bearings, and the four tower assembly bolts 10.

Pitch must be computed to limit negative pitch to minus 3 degrees and to limit positive pitch to plus 7 degrees in reference to a level 0 degree position of the bottom surface of the rotor blade.

Note that the 0 degree level position of the blade is equal to the level of the bottom of the rotor head, and that maintaining the correct relationship of the various parts of the pitch changing mechanism to this level is absolutely essential. When the unit is finally assembled and the actuating shaft 9 is pulled to it's lowest position, the blade root pitch change lever 20 must not exceed negative 3 degrees to the bottom of the rotor head. If it does exceed, permanent shims must be placed to reduce the negative pitch space 21 until the correct reading of less than negative 3 degrees is achieved.

Maximum negative pitch can be set by allowing ⅛ inch negative pitch space 21 between the carrier bearing locking collar 22 and the main spindle top 8 when the bottom surface of the rotor blade is at the 0 degree level position. You can use a temporary shim during initial construction to securely maintain this ⅛ inch space. Note the Caveat above when the unit is finally assembled.

Maximum positive pitch can be set by adjusting the height of the middle tower block 14 to allow ¼ of an inch positive pitch space 23 between the top of the actuating shaft 9 and a straight edge placed across the top of the middle tower block, with the above mentioned temporary shim in place.

The bottom of the side walls 1 in FIG. 3 are cut at an angle of three degrees from the vertical center to the outside edge, to provide the required 3 degree coning angle 29 for the blades (do not confuse this with the negative 3 degrees pitch discussed above.)

Rotor blade anchor blocks 30 are bolted 31 between the sidewalls and drilled to receive PTFE sleeves 57 and the large blade root anchor bolts 32, which are turned to change the pitch of the blades.

The sidewalls also carry the teeter bolt 3, the pitch linkage plate stabilizing pin 27, and flap stop bolts 33 which must be positioned to strike the tower bottom section 11 to insure that blade flap does not exceed eight degrees up or down when extreme conditions are met. Top cover mounting holes 34 are indicated here and on FIGS. 10 and 11.

The relative position of the pitch linkage plate 19 on the side wall 1 is noted with a dashed line on FIG. 3.

Figure 6:
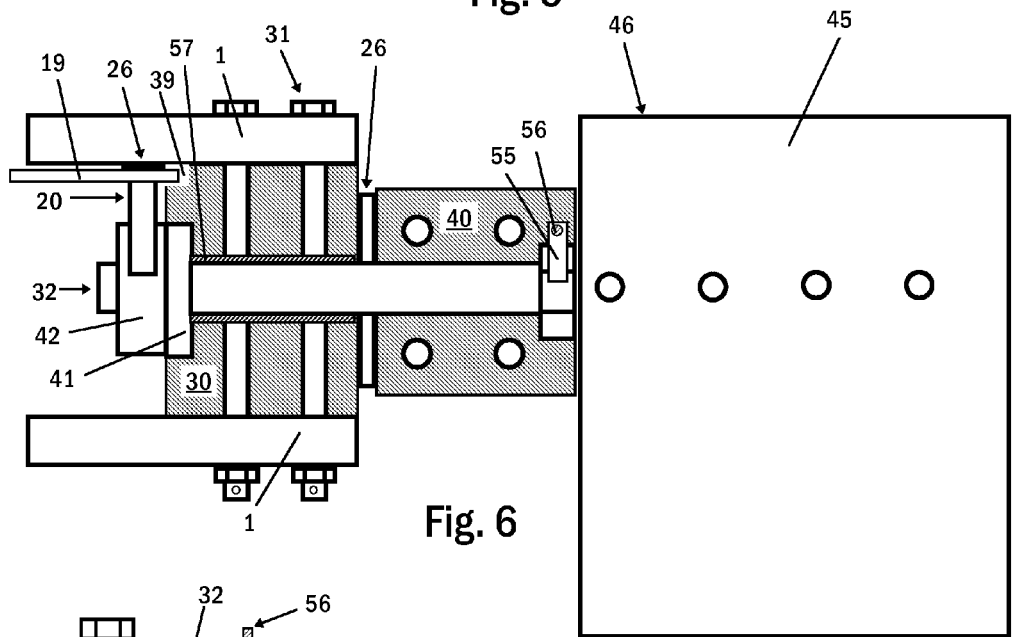
FIG. 6 is a cross section of FIG. 5 viewed from the top with side walls added for clarity.

Since the pitch linkage plate in FIG. 4 is designed to be raising or lowering the leading edge of each blade 46 in FIG. 6, the plates, which do not cover the entire side wall, are located on the side walls corresponding to the leading edge of each blade.

The pitch linkage plate 19 shows the teeter bolt guide slot 35 that rides over the teeter bolt 3, the stabilizing pin guide slot 36 that rides over the stabilizing pin 27, the curved receiver slot 18 for the upper pitch lever 17, the round receiver hole for the blade root pitch change lever 37, and the cutout notch 38 to clear the flap stop bolt 33. The stabilizing notch 39 for the pitch linkage plate 19 in the rotor blade anchor blocks 30 are shown in FIG. 6 and FIG. 12.

Figure 13:
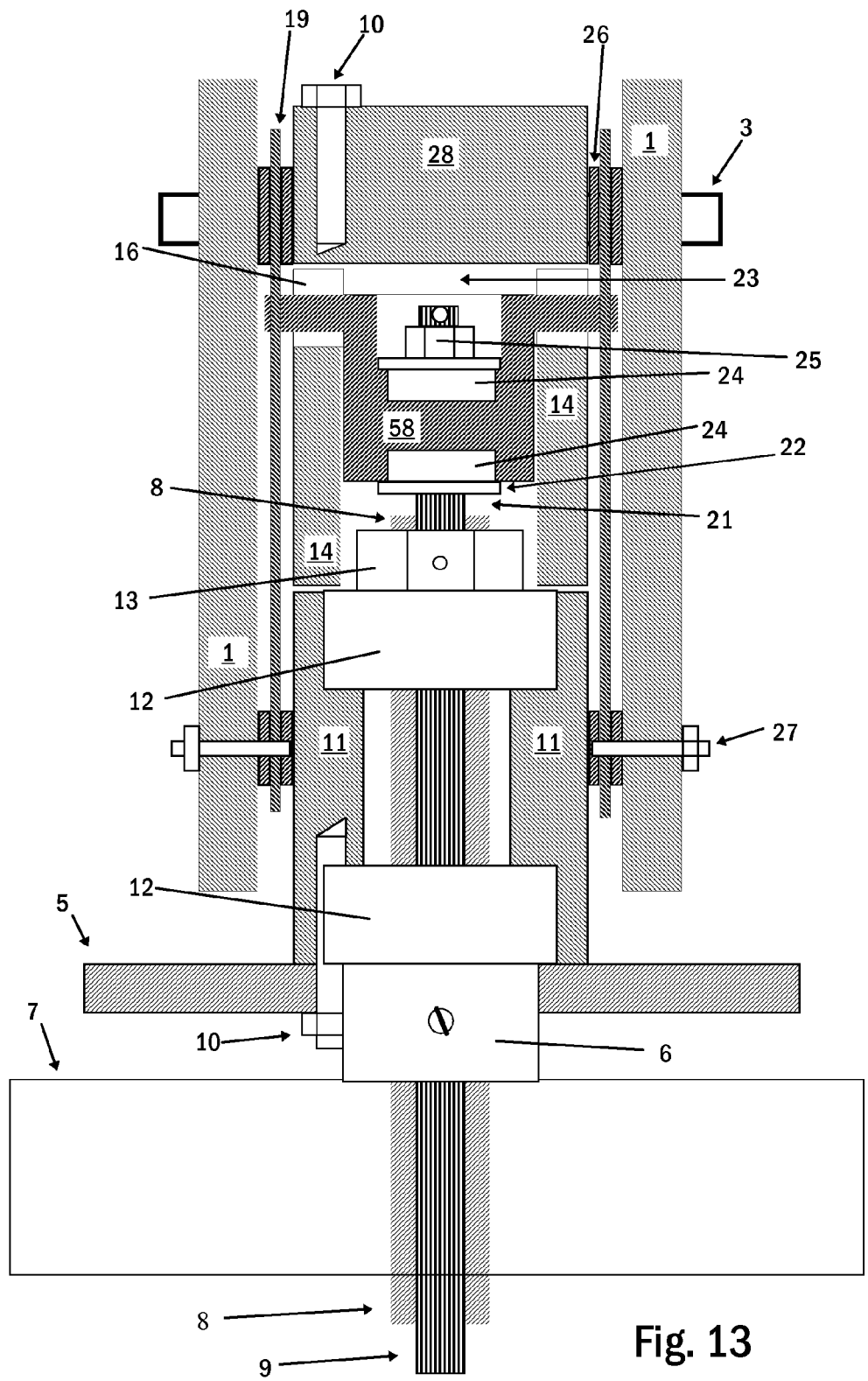
FIG. 13 is a modification of FIG. 2 showing changes required for the alternative combination of the carrier and the top levers into a single unit.

Slot 18 is curved to match the arch of the teetering movement of the sidewall 1, so that the teetering action will not change the vertical position of the pitch linkage plate 19, thus avoiding the small oscillation in pitch that would result as the rotor head teeters. The location of Alternate slot Alt 18 for use with the alternate design in FIG. 13 is also shown.

Figure 5:
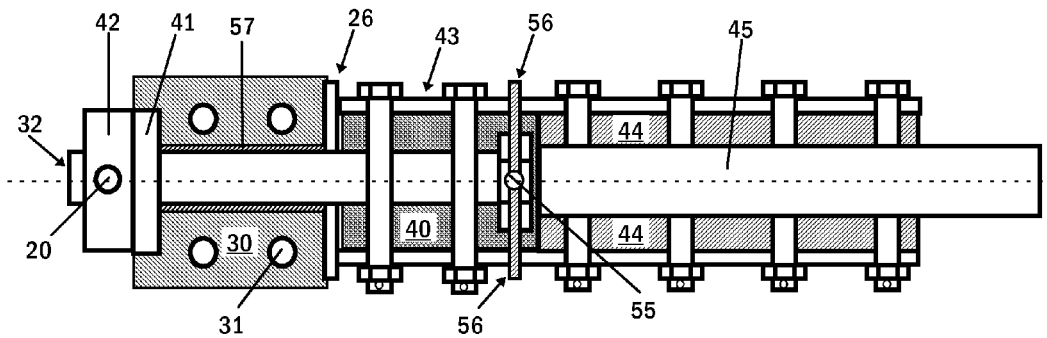
FIG. 5 is a cross section of the rotor blade anchor block, secondary blade block and blade attachment means viewed from the side.

FIG. 5 shows a cross sectional view of the rotor blade anchor block 30 and associated blade supporting structures viewed from the side.

FIG. 6 shows cross sectional view of FIG. 5 viewed from the top.

Figure 7:
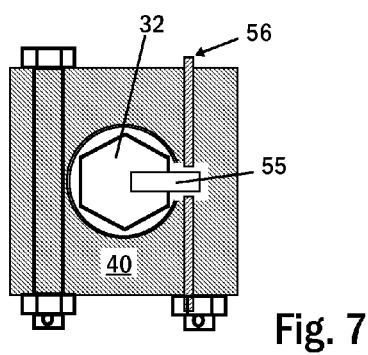
FIG. 7 is a drawing of the pitch fine tuning mechanism.

FIG. 7 shows the blade pitch fine tuning mechanism from the distal end of the secondary blade block.

An oil impregnated bronze washer 26 provides easy turning and elimination of need for slack between the rotor blade anchor block 30 and the secondary blade block 40.

The blade root anchor bolt 32 joins the three with the fine tune stud 55 in it's head firmly fixed by the fine tune set screws 56 in the distal end of the secondary blade block 40, and it's threaded end coming through PTFE sleeves 57 in the rotor blade anchor block 30 to a position between the sidewalls 1, with all held together by a thrust bearing 41 and a large anchor bolt locking nut 42 with the blade root pitch change lever 20 threaded into the side of the nut and penetrating ⅛ inch into the blade root anchor bolt 32 to lock the nut onto the bolt.

Drilling and tapping the nut and drilling the bolt for the ⅛ indent is done during a test assembly of the whole rotor head, as the last and essential step in setting the position of the blade level with the bottom of the rotor head (with the temporary ⅛ shim in place) in order to establish the correct position of the blade in relation to the rest of the mechanism to achieve accurate and predictable pitch changing. The fine tune set screws are provided just in case the drilling and tapping are not absolutely perfect, or if the pitch of either blade requires adjustment for any reason, perfection being the name of the game for a smooth spinning rotor.

FIG. 7 shows the distal end of the secondary blade block 40, with the fine tune stud 55 inserted into the head of the blade root anchor bolt 32, and the fine tune set screws 56 threaded into the secondary blade block.

Steel blade straps 43 are bolted to the top and bottom of the secondary blade block 40, and filler blocks 44 are fashioned to the correct thickness to provide a snug fit for the rotor blades 45 to be bolted between them. The procedures for mounting the blades are well known and no unique claims are made regarding that aspect of the work.

Creating an accurate spanwise alignment of the rotor blades is very difficult, especially in a home building shop with limited space and facilities, and adjustment after the fact is often necessary and sometimes not very satisfactory. One way to help with alignment in this design would be to put a lead-lag hinge between the secondary blade block and the blade, with narrow limits to it's movement, to allow the blade to seek it's own alignment. These hinges have been used since the earliest days in helicopters, but seldom in the autogiro.

Figure 8:
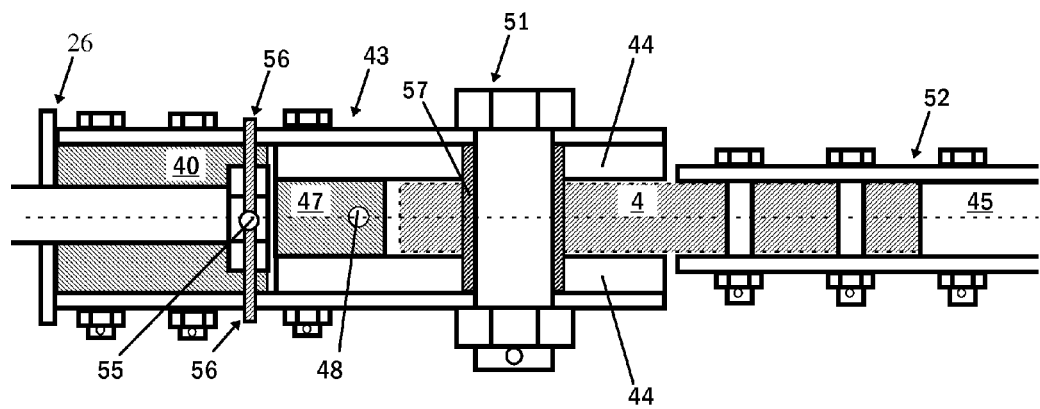
FIG. 8 is a modification of FIG. 5 to add a hub bar and lead-lag hinge.

FIG. 8 shows cross sections of portions of FIG. 5 beginning at the bronze washer 26, with modifications to add the hub bar 4 and lead-lag hinge.

Figure 9:
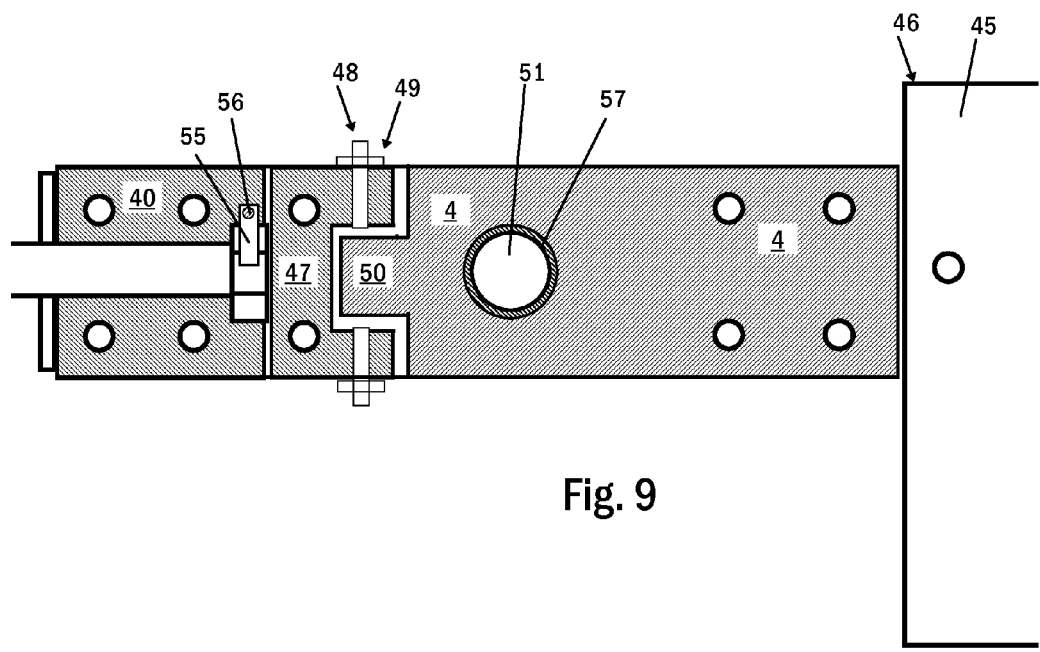
FIG. 9 is a cross section of FIG. 8 viewed from the top.

FIG. 9 is a cross sectional view of FIG. 8 viewed from the top

No claims are made for the hub bar and lead-lag portions of these figures, since both have been in use for over 80 years. They are included to provide a complete unit since rotor blades are often not long enough, and a hub bar provides the additional length needed. Since the lead-lag hinge is only a very small amount of additional work and expense, may save some difficult adjusting later, and provides the benefit of single bolt removal of the blades, it seems logical to include it as well.

Instead of inserting the rotor blade 45 between the filler blocks 44, a hub bar 4 is fashioned at the same thickness as the blade and the same width as the straps, with a three quarter inch square hub bar tongue 50 on the primal end, and at whatever length is needed to create the required total length of the rotor system.

A lead-lag stop block 47 is bolted between the filler blocks 44 behind the secondary blade block 40, and is drilled and threaded for two limit/stop lead-lag set screws 48. The set screws can be adjusted to allow any desired amount of lead or lag.

PTFE sleeves 57 are pressed into holes drilled in the hub bar, and a large lead-lag hinge bolt 51 is inserted through the steel blade straps 43, the filler blocks 44, thin high carbon steel thrust washers, and the PTFE sleeves in the hub bar 4. The hinge bolt is left just loose enough that with a little grease between the thrust washers, the lead-lag movement can occur. If a fixed alignment is desired, the lead-lag set screws can be adjusted snug against the hub bar tongue 50 for correct spanwise alignment, and the large lead-lag hinge bolt then tightened securely. Lock nuts 49 are placed on the lead-lag set screws 48 to hold their setting.

A secondary set of blade straps 52 are then bolted to the hub bar 4 for mounting the rotor blade 45.

Figure 10:
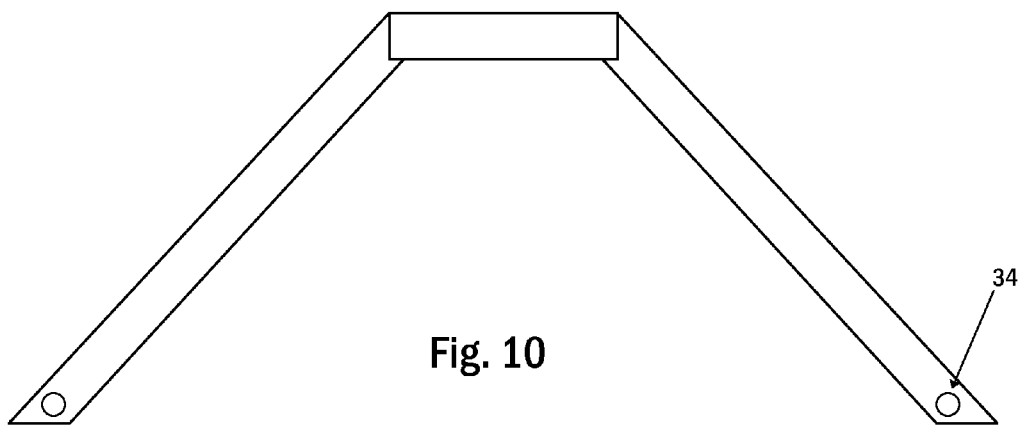
FIG. 10 shows the protective cover viewed from the side.

FIG. 10 shows the top cover from the side with mounting holes 34 in the bottom edges to secure it to the sidewalls. The top is easily opened by loosening one bolt and removing the second in order to routinely inspect the pitch change parts contained within.

Figure 11:
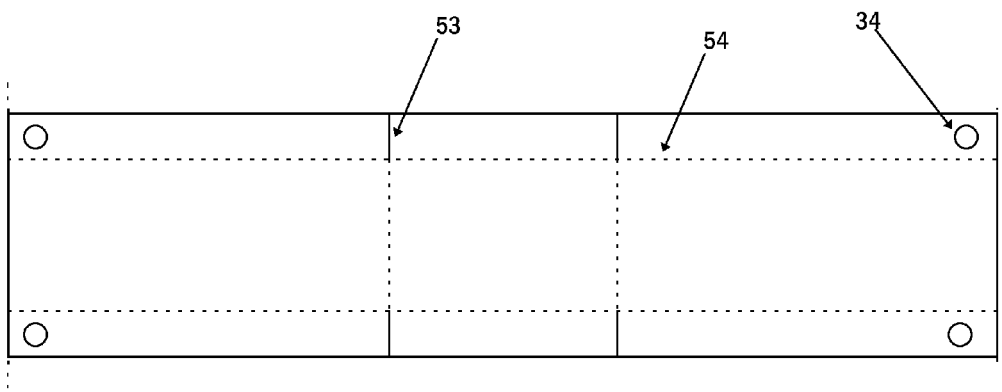
FIG. 11 shows the cover as a flat sheet with cut and fold lines

FIG. 11 shows the top cover as a single sheet with mounting holes 34, and four cut lines 53 required to allow folding on the dashed fold lines 54.

FIG. 12 shows a cross sectional view of this invention from the top, to provide a visual overview of the relationship of the parts to each other, which parts are described in detail in the previous figures.

FIG. 13 shows an alternative drawing of FIG. 2 in which the carrier 15 and two upper pitch change levers 17 are combined into a one piece carrier-lever 58, which allows the bearing and nut on top to be completely recessed in the carrier, so that the levers are at the very top of the carrier, and the windows 16 are at the top of the tower middle section, and the alternative slots Alt 18 where the levers enter the pitch linkage plate are raised to be as close to the teeter bolt 3 as possible. This reduces wear between the lever and the plate by reducing movement between them, so that Alt 18 no longer needs to be a curved slot but merely a stretched hole about 3/32 wider on each side. The wear area is reduced from a total of 9/16 inch to a total of 3/16 inch, a two thirds reduction.

However, since the actual area of wear saved is really quite small, and compensated by PTFE bearings, the modification is not necessary for safe operation of the invention, and since the one piece alternative is much more complicated to make, requiring creation of special jigs, some home builders may decide the improvement is not possible for them, or just unnecessary and not worth the effort, so it is presented only as an alternative. For commercial builders with computer controlled equipment it will not be difficult to do.

Currently available pre-rotator systems and rotor brake systems can be easily adapted to this rotor head.

Since none of the rotor heads currently designed are capable of accepting the unique structures of this design, it has been necessary to design a complete rotor head to utilize them.

NUMBER USAGE SUMMARY 1 sidewalls
2 teetering central tower
3 teeter bolt
4 hub bar
5 pre-rotator plate
6 collar/spacer
7 top gimbal member
8 main spindle
9 actuating shaft
10 tower assembly bolt
11 tower bottom section
12 main bearings
13 locking nut
14 tower middle section
15 carrier
16 windows
17 upper pitch change levers
18 curved receiver slot
Alt 18 alternate slots
19 pitch linkage plate
20 blade root pitch change lever
21 negative pitch space
22 carrier bearing locking collar
23 positive pitch space
24 carrier thrust bearings
25 3/8 locking nut
26 oil impregnated washers
27 pitch linkage plate stabilizing pin
28 tower top section
29 coning angle
30 rotor blade anchor blocks
31 bolt
32 blade root anchor bolts
33 flap stop bolts
34 top cover mounting holes
35 teeter bolt guide slot
36 stabilizing pin guide slot
37 receiver hole for blade root pitch change lever
38 cutout notch
39 stabilizing notch
40 secondary blade block
41 thrust bearing
42 anchor bolt locking nut
43 steel blade straps
44 filler blocks
45 rotor blades
46 leading edge of blade
47 lead-lag stop block
48 lead-lag set screws
49 locking nuts
50 hub bar tongue
51 lead-lag hinge bolt
52 secondary blade straps
53 cut lines
54 fold lines
Added
55 fine tune stud
56 fine tune set screws
57 PTFE sleeves
58 one piece carrier-lever

I claim:

1. A mechanical structure for a rotor blade pitch change mechanism in a teetering rotor head, the mechanical structure comprising:

two teetering sidewalls, each teetering sidewall having an inside, which faces the other teetering sidewall, and an outside, which is opposite the inside of each teetering sidewall, a three piece hollow central tower, located between the two teetering sidewalls, composed of a top section, a middle section, and a bottom section, with the top section supporting horizontally a teeter bolt, with windows in the middle section, and with the bottom section to receive main bearings, the teeter bolt, passing through the top section of the hollow central tower, connecting the teetering sidewalls in an upper region of the teetering sidewalls, an actuating shaft sliding inside a hollow main spindle, the main spindle passes through the bearings located in the bottom section of the hollow central tower, between the teetering sidewalls, a carrier attached to an upper portion of the actuating shaft, located in the hollow central tower, two upper pitch change levers, located on opposite sides of the carrier, the upper pitch change levers pass through the windows in the middle section of the hollow central tower, two pitch linkage plates slideably engaged on the teeter bolt and stabilizing pins on the inside of the teetering sidewalls, the pitch linkage plates engage the two upper pitch change levers that pass through the windows in the hollow central tower, two rotor blade anchor blocks, each attached between the two teetering sidewalls, the rotor blade anchor blocks are located at opposite ends of the teetering sidewalls in a horizontal direction, two blade root anchor bolts, each supported by a rotor blade anchor block, a blade root pitch change lever attached to each blade root anchor bolt, the blade root pitch change levers engaged with respective pitch linkage plates.

* * * * *